(12) United States Patent
Song et al.

(10) Patent No.: US 6,366,267 B1
(45) Date of Patent: Apr. 2, 2002

(54) ELECTRONIC DEVICE WITH MINIATURE VIRTUAL IMAGE DISPLAY

(75) Inventors: John Song, Tempe; Karen E. Jachimowicz, Laveen; Curtis D. Moyer, Phoenix, all of AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 08/324,038

(22) Filed: Oct. 17, 1994

Related U.S. Application Data

(63) Continuation-in-part of application No. 07/767,178, filed on Sep. 30, 1991.

(51) Int. Cl.[7] .................................................. G09G 3/00
(52) U.S. Cl. ............................ 345/82; 345/32; 345/44; 379/93.17
(58) Field of Search ............................ 345/44, 82, 46, 345/45, 32, 1.2; 340/825.44, 815.13, 815.31; 379/58, 59, 61, 96, 433, 93.17, 93.19, 93.23, 110.01; 385/120; 313/500; 250/227.28, 214 VT; 359/804

(56) References Cited

U.S. PATENT DOCUMENTS

| | | | | |
|---|---|---|---|---|
| 4,076,978 A | * | 2/1978 | Brennan et al. ....... | 250/227.28 |
| 4,329,625 A | * | 5/1982 | Nishizawa et al. ........... | 315/58 |
| 4,481,382 A | * | 11/1984 | Villa-Real ..................... | 379/61 |
| 4,481,506 A | * | 11/1984 | Homna ........................ | 250/574 |
| 5,051,738 A | * | 9/1991 | Tanielian et al. ............. | 345/82 |
| 5,369,415 A | * | 11/1994 | Richard et al. ................ | 345/6 |
| 5,485,145 A | * | 1/1996 | Sniff ............................ | 345/45 |

FOREIGN PATENT DOCUMENTS

| WO | 8606238 | * | 10/1986 |
|---|---|---|---|

* cited by examiner

*Primary Examiner*—Lun-Yi Lao
(74) *Attorney, Agent, or Firm*—Eugene A. Parsons; William E. Koch

(57) ABSTRACT

A portable electronic device with virtual image display including a semiconductor array providing a real image and an optical system mounted to receive the real image and produce a virtual image at a viewing aperture. Electronics are associated with the array to produce real images in accordance with messages received by a data source such as a communication receiver. The display is sufficiently small to mount in a hand held microphone for viewing by the operator while using the microphone.

28 Claims, 7 Drawing Sheets

ELECTRONIC DEVICE WITH MINIATURE VIRTUAL IMAGE DISPLAY

RELATED DOCUMENTS

The present application is a continuation-in-part of a copending application entitled "Receiver With Miniature Virtual Image Display", Ser. No. 07/767,178, filed on Sep. 30, 1991.

FIELD OF THE INVENTION

The present invention pertains to portable electronic devices and more particularly to visual displays with portable electronic devices and more specifically communications receivers.

BACKGROUND OF THE INVENTION

Portable communications receivers and other electronic equipment, such as radios, cellular and cordless telephones, pagers, data banks and the like, are becoming increasingly popular. In many instances it is desirable to provide a visual display on the receiver to supply the operator with a visual message. The problem is that visual displays require relatively high electrical power and require a great amount of area to be sufficiently large to produce a useful display.

In the prior art, for example, it is common to provide visual displays utilizing liquid crystal displays, directly viewed light emitting diodes, etc. These produce very large and cumbersome displays that greatly increase the size of the receiver and require relatively large amounts of power.

In one instance, the prior art includes a scanning mirror to produce a visual display but again this requires relatively large amounts of power and is very complicated and sensitive to shock. Also, the scanning mirror causes vibration in the unit which substantially reduces visual comfort and acceptability.

SUMMARY OF THE INVENTION

It is an object of the present invention to provide a new and improved portable electronic device with miniature virtual image display.

It is a further object of the present invention to provide a new and improved portable electronic device with miniature virtual image display which substantially reduces the amount of power required.

It is a further object of the present invention to provide a new and improved portable electronic device with miniature virtual image display requiring substantially less space to provide a useful and easily perceivable display.

These and other objects and advantages are realized in a portable electronic device including a data source and a miniature virtual image display having a viewing aperture, the display being operably attached to the data source and including image generation apparatus for providing a real image with a luminance less than approximately 15 fL and a fixed optical system for producing, from the real image, a virtual image perceivable through the viewing aperture.

BRIEF DESCRIPTION OF THE DRAWINGS

Referring to the drawings.

DESCRIPTION OF THE PREFERRED EMBODIMENTS

Figure 1A:
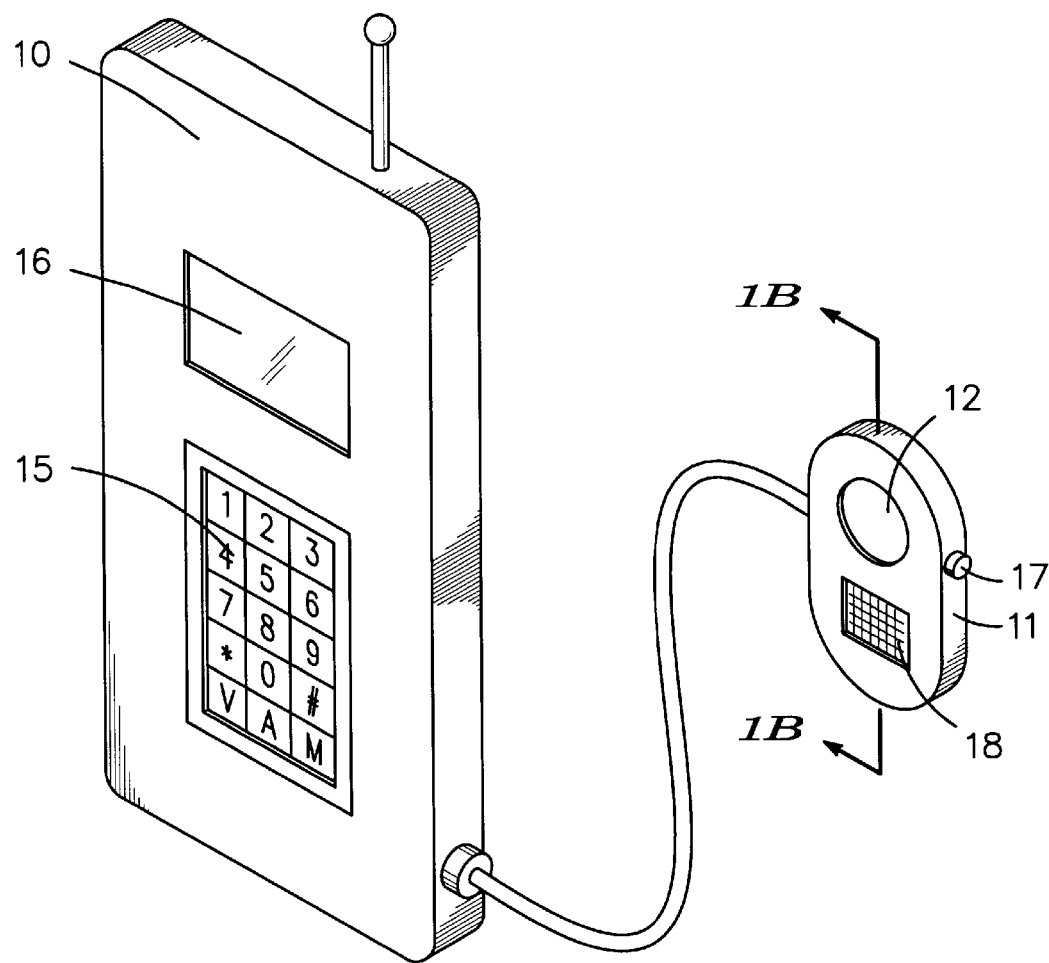
FIG. 1A is a view in perspective of a portable communications receiver embodying the present invention.

FIG. 1A, illustrates a portable communications receiver 10 having a hand held microphone 11 with a miniature virtual display 12 mounted therein It will of course be understood that portable communications receiver 10 can be any of the well known portable electronic devices, such as a cellular or cordless telephone, a two-way radio, a pager, portable data banks, etc. In the present embodiment, for purposes of explanation only, portable communications receiver 10 is a portable two-way police radio, generally the type carried by police officers on duty or security guards. Portable communications receiver 10 includes a control panel 15 for initiating calls and a standard visual display 16, if desired, for indicating the number called or the number calling. Alternately, 16 includes a speaker in addition to or instead of the visual display. Hand held microphone 11 has a push-to-talk switch 17 and a voice pick-up 18.

Figure 1B:
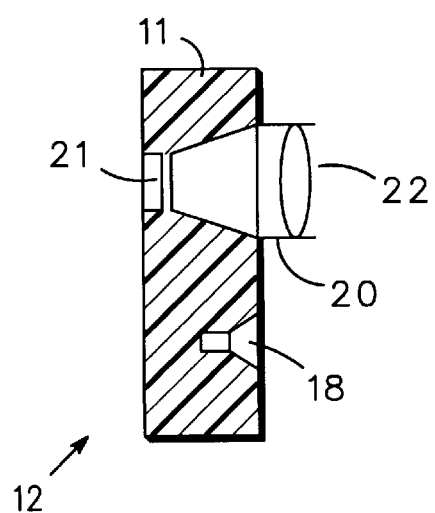
FIG. 1B is a simplified view as seen from the line 1B—1B in FIG. 1A.

Referring to FIG. 1B, a simplified sectional view of hand held microphone 11 , as seen from the line 1B—1B, is illustrated. Miniature virtual display 12 includes image generation apparatus 21 for providing a real image to a fixed optical system 20, which in turn produces a virtual image viewable by the operator through an aperture 22. Fixed optical system 20 is constructed to magnify the entire real image from image generation apparatus 21, without utilizing moving parts, so that the virtual image viewable through aperture 22 is a complete frame, or picture, which appears to be very large and is easily discernible by the operator. By producing a virtual image from the very small real image of the apparatus 21, fixed optical system 20 is relatively small and adds virtually no additional space requirements to hand held microphone 11. Optical system 20 is constructed with no moving parts, other than optional features such as focusing, zoom lenses, etc. Further, apparatus 21 requires very little electrical power to generate the real image and, therefore, adds very little to the power requirements of portable communications receiver 10.

Figure 2A:
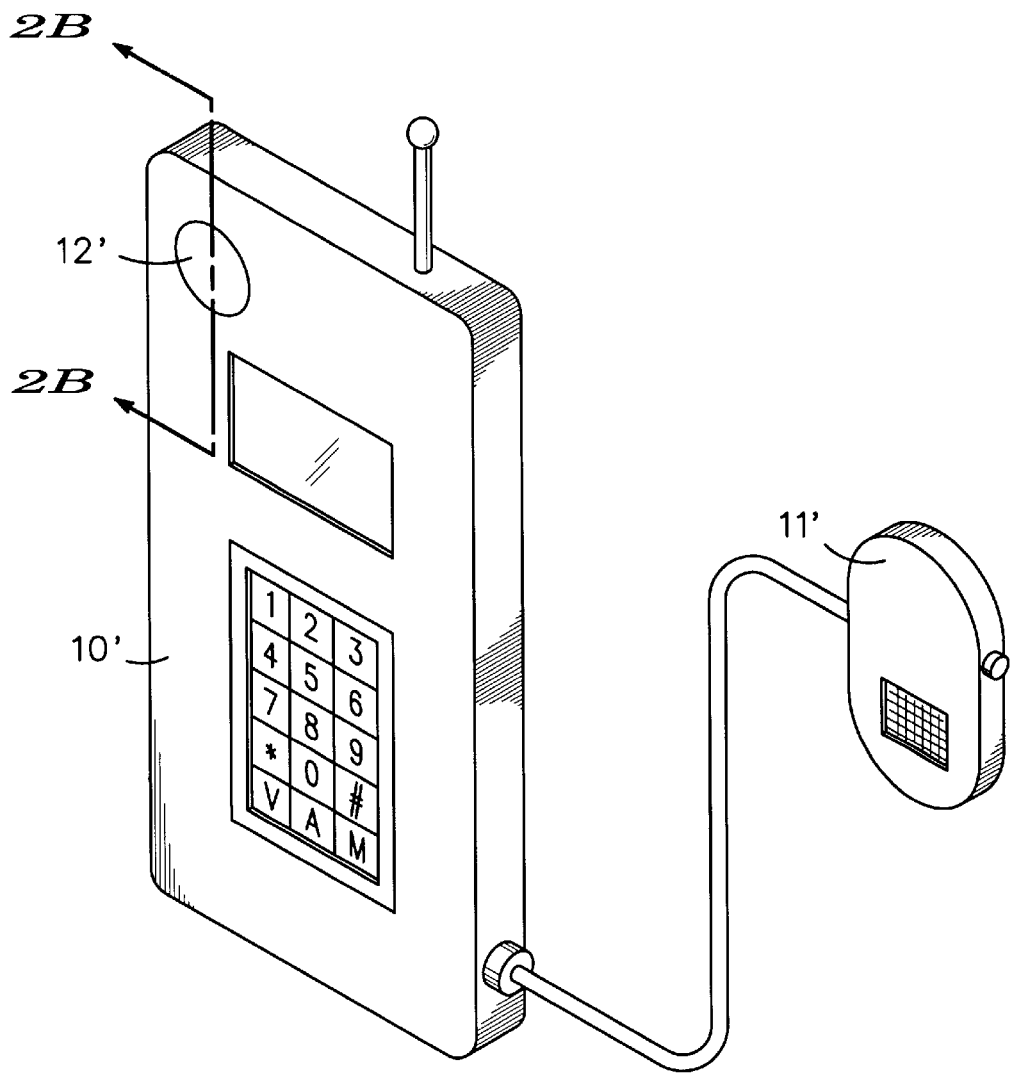
FIG. 2A is a view in perspective, similar to FIG. 1, of another embodiment of the present invention.
Figure 2B:
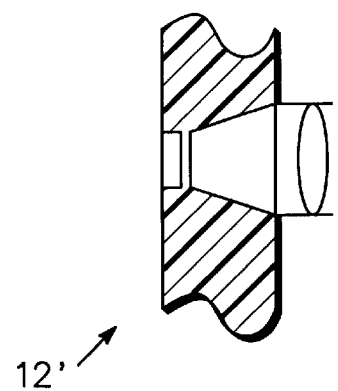
FIG. 2B is a simplified view as seen from the line 2B—2B in FIG. 2A.

Referring specifically to FIGS. 2A and 2B, a second embodiment is illustrated wherein similar parts are designated with similar numbers with a prime added to the numbers to indicate a different embodiment. In this embodiment a portable communications receiver 10' has a miniature virtual display 12' included in the body thereof, instead of in a hand held microphone 11'. Hand held microphone 11' is optional and this specific embodiment is desirable for instances where a hand held microphone is not utilized or not available. Miniature virtual display 12' is basically similar to miniature virtual display 12 of FIGS. 1A and 1B and adds very little to the size, weight, or power consumption of receiver 10'.

Figure 3:
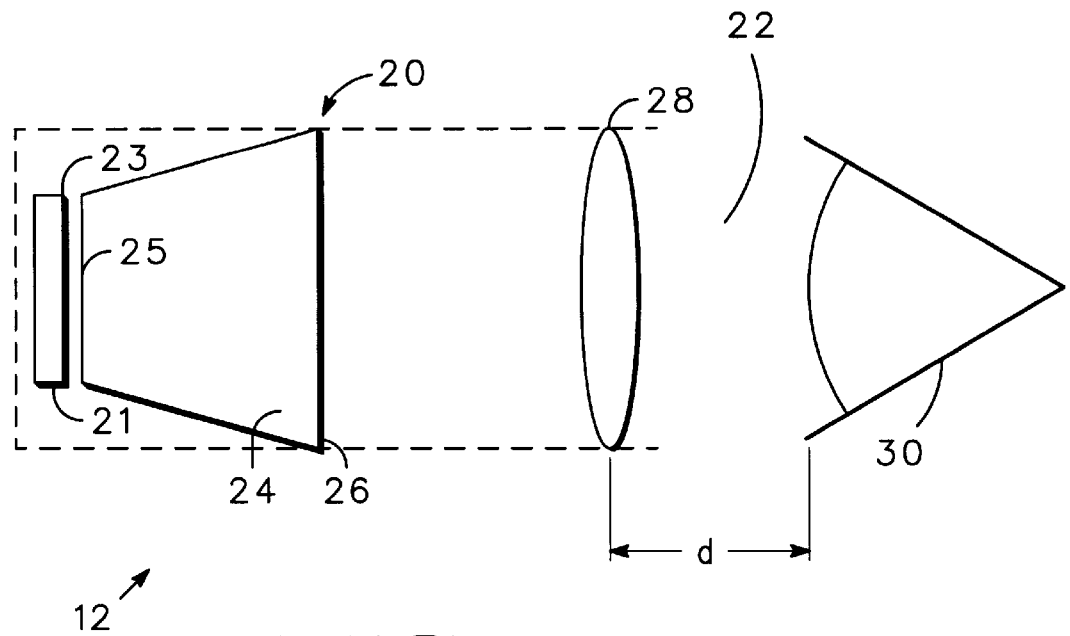
FIG. 3 is a simplified schematic view of a miniature virtual image display included in the portable communications receiver of FIG. 1.

Referring to FIG. 3, a specific miniature virtual image display 12 is illustrated in a simplified schematic view. Display 12 includes apparatus 21 for providing a real image on a surface 23. Fixed optical system 20, in this specific embodiment includes a coherent bundle 24 of optical fibers and a lens system. Bundle 24 has a first surface 25 positioned adjacent the surface 23 of apparatus 21 and a second surface 26 defined at the opposite end of bundle 24. Lens 28, representing the lens system, is positioned in spaced relation to surface 26 of bundle 24 and, in cooperation with bundle 24, produces a virtual image viewable by an eye 30 spaced from a viewing aperture 22 generally defined by lens 28. "Viewable", or "perceivable" as used throughout this disclosure is defined to mean that the image is magnified sufficiently (e.g. 8.5"×11") so that when, for example, the virtual image is a full page of text the operator can clearly and easily read the text.

Surface 25 of bundle 24 is positioned adjacent LED array 35 so as to pick up real images generated thereby and transmit the image by way of the optical fibers to surface 26. Bundle 24 is tapered along the length thereof so that the image at surface 26 is larger than the real image at surface 25. The taper in the present embodiment provides an image at surface 26 which is twice as large as the image at surface 25, which is equivalent to a power of two magnification. It will be understood by those skilled in the art that additional magnification (taper) may be included if desired.

The lens system, represented schematically by lens 28, is mounted in spaced relation from surface 26 of bundle 24 so as to receive the image from surface 26 and magnify it an additional predetermined amount. In the present embodiment, lens 28 magnifies the image another ten times (10×) so that the real image from LED array 35 is magnified a total of twenty times. It will of course be understood that the lens system may be adjustable for focus and additional magnification, if desired, or may be fixed in a housing for simplicity. Because the image received by lens 28 from bundle 24 is much larger than LED array 35, the lens system does not provide the entire magnification and, therefore, is constructed larger and with less magnification. Because of this larger size, the lens system has a larger field of view and a greater working distance.

Eye relief is the distance that eye 30 can be positioned from viewing aperture 22 and still properly view the image, which distance is denoted by "d" in FIG. 3. Because of the size of lens 28, eye relief, or the distance d, is sufficient to provide comfortable viewing and in the present embodiment is great enough to allow a viewer to wear normal eyeglasses, if desired. It should be understood that the fiber-optic magnifying optical system of FIG. 3 is disclosed as a specific example and any type of magnifying system (not requiring vibrating mirrors and the like) can be used, e.g., systems incorporating refractive, reflective, diffractive, or holographic optical elements, or any combination thereof.

Figure 4:
FIG. 4 is a simplified block diagram of electronics associated with the miniature virtual image display of FIG. 3.

Apparatus 21 is illustrated in more detail in FIG. 4 and includes, for example, semiconductor electronics such as a light emitting device (LED) array 35 driven by data processing circuits 37. The LEDs may be, for example, organic or inorganic light emitting diodes, vertical cavity surface emitting lasers, field emission devices, etc. Data processing circuits 37 include, for example, logic and switching circuit arrays for controlling each LED in LED array 35. Data processing circuits 37 include, in addition to or instead of the logic and switching arrays, a microprocessor or similar circuitry for processing input signals to produce a desired real image on a device such as LED array 35.

Figure 5:
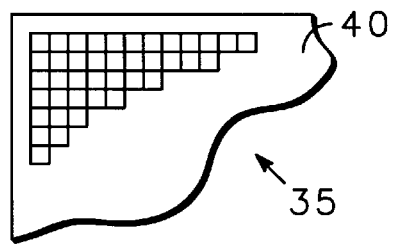
FIG. 5 is an enlarged view in top plan of an LED array, portions thereof broken away, forming a portion of the electronics of FIG. 4.

In this specific embodiment LED array 35 is utilized because of the extremely small size that can be achieved and because of the simplicity of construction and operation. Referring specifically to FIG. 5, a plan view of LED array 35 is illustrated in which pixels are formed in a regular pattern of rows and columns on a single substrate (e.g. a semiconductor chip) 40. Each pixel includes at least one LED, with additional parallel LEDs being included, if desired, for additional brightness and redundancy. By addressing specific pixels by row and column in a well known manner, the specific pixels are energized to produce a real image. Digital or analog data is received at input terminal 38 and converted by data processing circuits 37 into signals capable of energizing selected pixels to generate the predetermined real image. The digital or analog data is received from any data source, such as a communication receiver, a memory or data bank in the device, etc.

It will be understood by those skilled in the art that LED array 35 and substrate 40 are greatly enlarged in the FIGS. The actual size of substrate 40 is on the order of a few milli-meters along each side with each LED being on the order of 5 to 50 microns on a side (or in diameter if the LED is round). Because of the extremely small size of substrate 40, drive lines or metal connecting traces between LEDs, have a very small cross-section, which severely limits their current carrying capacity, or current density. Referring to FIG. 5 for example, in one typical operation only a row at a time is addressed or "turned ON". Thus, the metal trace for each column needs to carry only sufficient current for one LED (the one LED in the row which is ON). However, all of the LEDs in the ON row could potentially be turned ON simultaneously. Thus, the metal trace for the ON row, which can potentially be required to carry current for however many LEDs are in the row (e.g. 100 to 1500 LEDs), must carry many times as much current as the column metal traces.

It has been found that a direct view display needs a higher luminance (brightness) than a virtual image display to be visible in the same light conditions. The reason for this goes back to the sensitivity of the human eye and the fact that what our eye sees is "luminance contrast", rather than just luminance. Direct view displays need about 25 foot-Lamberts (fL) to be visible in office environments, and more than 100 fL to be visible in outdoor environments, because they compete with the luminance of the environment, and reflect ambient light from their surface, both of which lower the visible luminance contrast of the display. Luminance is a measure of power/unit area/unit steradian, and is stressed herein as a reliable measurement of the viewability of a display. Further, luminance is directly dependent upon the amount of current supplied to each LED and is, therefore, directly dependent upon the size of the LED array. By reducing the amount of luminance required for the proper operation of the display, the size of the LED array can be reduced and, consequently, the size of the entire display.

We have found, through a great deal of experimentation, that a virtual display needs 2 fL to be visible in an office environment, and no more than 10 fL to be visible in outdoors environments. Thus, it is believed that the virtual displays disclosed herein can be conveniently limited to an upper maximum of approximately 15 fL. The background of the virtual display is very dark, as opposed to the light background of the environment in the direct view display. Also, the virtual display does not have any ambient light reflecting off its surface to lower luminance contrast (the optics limit the light falling on the display element). Because the required luminance of the virtual displays disclosed herein is very low, the amount of electrical current density required to drive the LED array is low and the present LED arrays can be fabricated much smaller than arrays used in direct view displays.

Figure 6:
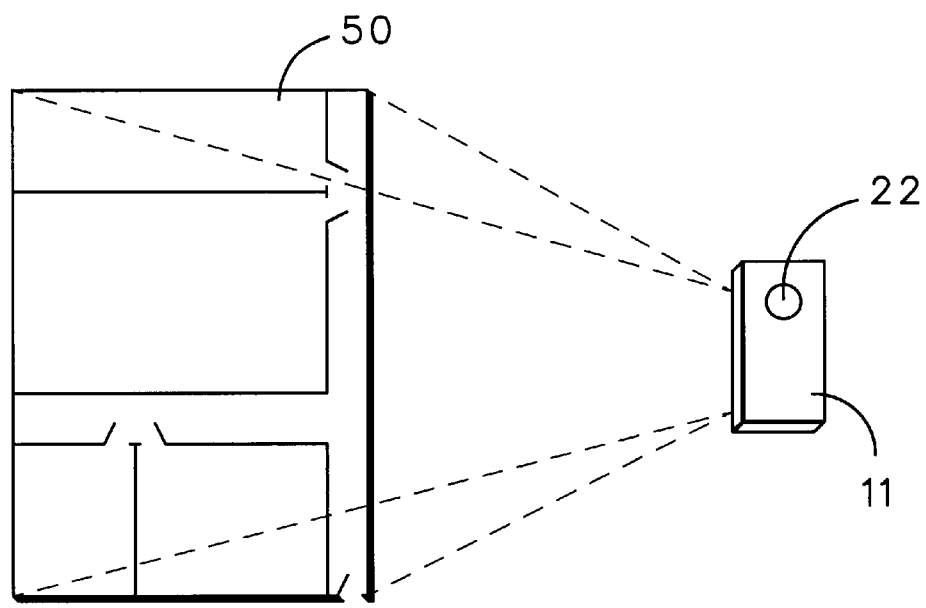
FIG. 6 is a view in perspective illustrating a typical view as seen by the operator of the portable communications receiver of FIG. 1.

FIG. 6 is a perspective view of hand held microphone 11 illustrating a typical view 50 seen by an operator looking into viewing aperture 22 of miniature virtual image display 12. View 50 could be, for example, a floor plan of a building about to be entered by the operator (a policeman). The floor plan is on file at the police station and, when assistance is requested by the policeman, the station simply transmits the previously recorded plan. Similarly, miniature virtual image display 12 might be utilized to transmit pictures of missing persons or wanted criminals, maps, extremely long messages, etc. Many other variations, such as silent receiver operation wherein the message appears on display 12 instead of audibly, are possible.

Figure 7:
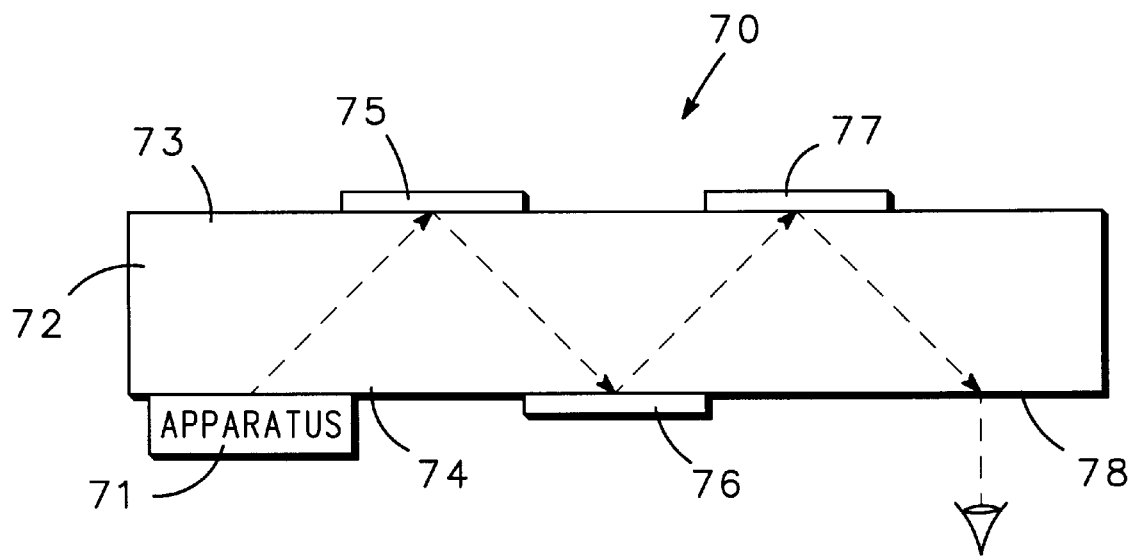
FIGS. 7, 8 and 9 are additional simplified schematic views, similar to FIG. 3, of other miniature virtual image displays usable in the portable communications receivers of FIGS. 1A through 2B.

Referring to FIG. 7, another specific miniature virtual image display 70 is illustrated in a simplified schematic view. In waveguide virtual image display 70 image generation apparatus 71, similar to apparatus 21 described above, is affixed to the inlet of an optical waveguide 72 for providing a real image thereto. Light rays from the real image at apparatus 71 are directed angularly toward a predetermined area on a first side 73 where they are reflected back toward a second side 74 generally along an optical path defined by sides 73 and 74. Three diffractive lenses 75, 76 and 77 are affixed to sides 73 and 74 at the next three predetermined areas, respectively, to which the reflected light rays are directed. Diffractive lenses 75, 76, and 77 provide the required amount of magnification so that a virtual image of a desired size is viewable at an aperture 78 defined by the outlet of optical waveguide 72.

Figure 8:
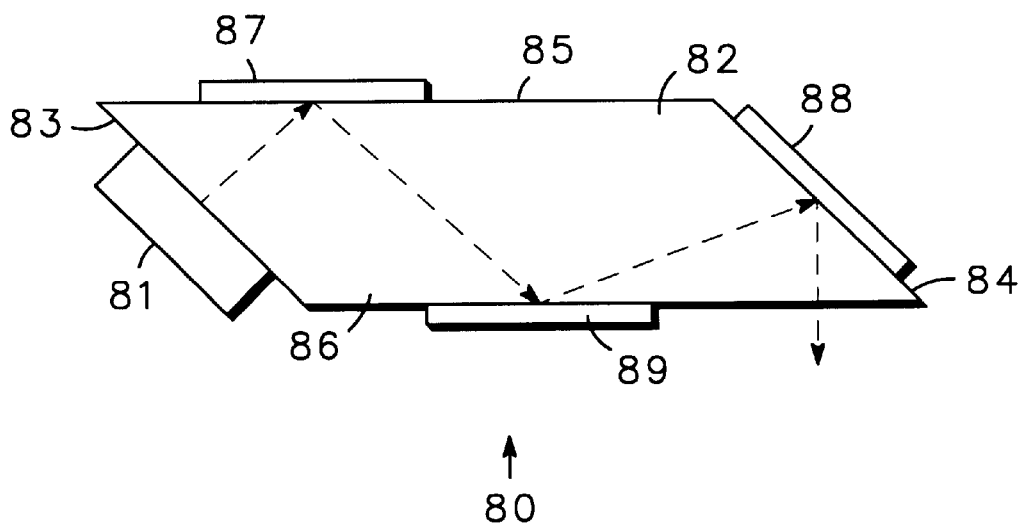

Referring to FIG. 8, another specific miniature virtual image display 80 is illustrated in a simplified schematic. In waveguide virtual image display 80, image generation apparatus 81, similar to apparatus 21 described above, is affixed to the inlet of an optical waveguide 82 for providing a real image thereto. Waveguide 82 is formed generally in the shape of a parallelogram (side view) with opposite sides, 83, 84 and 85, 86, equal and parallel but not perpendicular to adjacent sides. Side 83 defines the inlet and directs light rays from the real image at apparatus 81 onto a predetermined area on adjacent side 85 generally along an optical path defined by all four sides. Three diffractive lenses 87, 88 and 89 are positioned along adjacent sides 85, 84 and 86, respectively, at three predetermined areas and the magnified virtual image is viewable at an outlet in side 86. This particular embodiment illustrates a display in which the overall size is reduced somewhat and the amount of material in the waveguide is reduced to reduce weight and material utilized.

Figure 9:
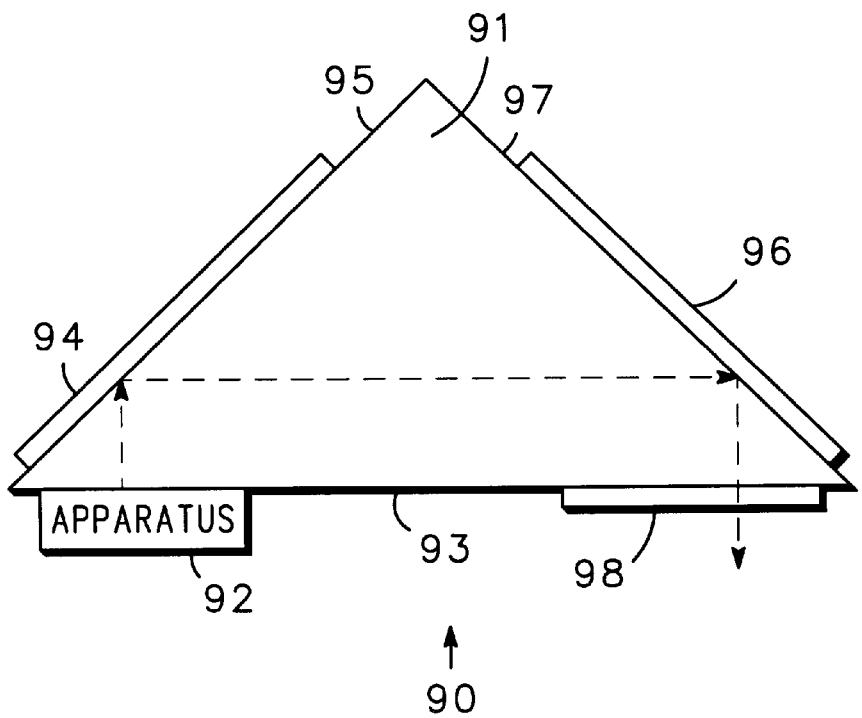

Referring to FIG. 9, another specific miniature virtual image display 90 is illustrated in a simplified schematic. In waveguide virtual display 90 an optical waveguide 91 having a generally triangular shape in side elevation is utilized. Image generation apparatus 92, similar to apparatus 21 described above, for producing a real image is affixed to a first side 93 of optical waveguide 91 and emanates light rays which travel along an optical path directly to a diffractive lens 94 affixed to a second side 95. Light rays are reflected from lens 94 to a diffractive lens 96 mounted on a third side 97. Lens 96 in turn reflects the light rays through a final diffractive lens 98 affixed to the outlet of optical waveguide 91 in side 93, which lens 98 defines a viewing aperture for display 90. In this particular embodiment the sides of display 90 are angularly positioned relative to each other so that light rays enter and leave the inlet and outlet, respectively, perpendicular thereto.

Miniature virtual image display 12, described above, is described in more detail in a copending application entitled "Compact Virtual Image Display", having Ser. No. 07/767, 179, filed Sep. 30, 1991 and assigned to the same assignee. Also, miniature virtual image displays 70, 80 and 90, along with other miniature virtual image displays that can be utilized in conjunction with the present invention, are described in more detail in a copending patent application entitled "Waveguide Virtual Image Display", Ser. No. 07/767,180, filed Sep. 30, 1991 and assigned to the same assignee (now U.S. Pat. No. 5,224,198, issued Jun. 29, 1993).

Figure 10A:
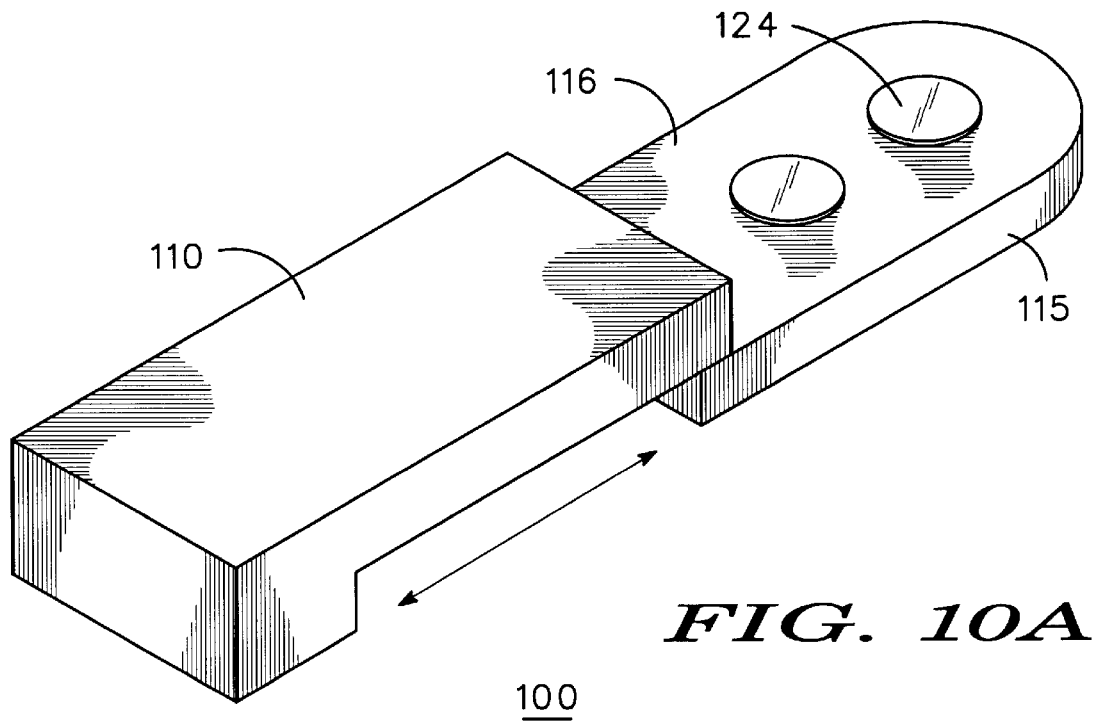
FIGS. 10A and 10B are perspective and side elevational views, respectively, of another communications receiver embodying the present invention.
Figure 10B:
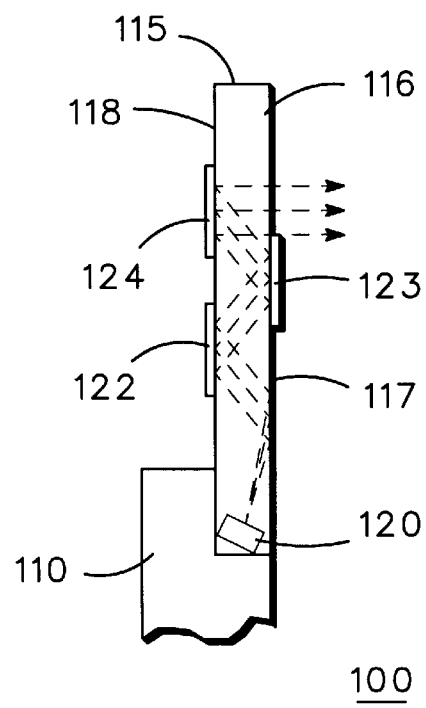

Referring specifically to FIGS. 10A and 10B, another communications receiver 100, embodying the present invention is illustrated in perspective and side elevation, respectively. Communications receiver 100 includes, for example, a pager 110 with miniature virtual image display 115 slideably attached thereto. Miniature virtual image display 115 includes an optical waveguide 116 having parallel spaced apart sides 117 and 118. Image generation apparatus 120, which is similar to apparatus 21 in FIG. 2, is positioned adjacent an inlet defined at one end of optical waveguide 116. Light rays enter optical waveguide 116 at an angle to side 117 and are reflected a plurality of times between sides 117 and 118. Optical waveguide 116 defines an optical path therethrough with predetermined reflection areas spaced apart therealong.

Three diffractive optical elements 122, 123 and 124 are positioned along optical waveguide 116 at three predetermined reflection areas and provide a required amount of magnification, aberration correction and/or filtering. Light rays are reflected from final diffractive optical element 124 to an outlet which defines a viewing aperture through which the operator can view the enlarged virtual image. In this specific embodiment miniature virtual image display 115 is constructed to slide into and out of the body of pager 110 to reduce the over-all size during nonuse.

Figure 11C:
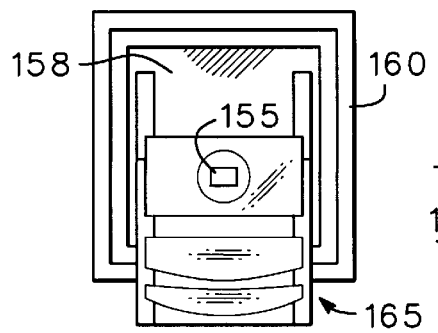
FIGS. 11A, 11B and 11C illustrate a front view, side elevational view, and top plan of another embodiment of the invention, approximately the actual size.
Figure 11A:
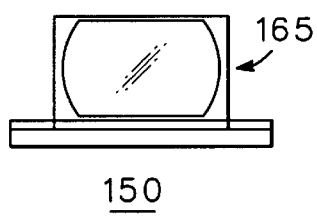
Figure 11B:
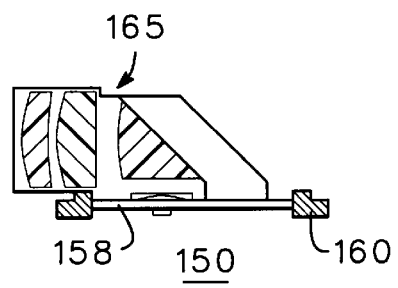

FIGS. 11A, 11B and 11C illustrate a front view, side elevational view, and top plan of another miniature virtual image display 150 in accordance with the present invention. FIGS. 11A, 11B and 11C illustrate miniature virtual image display approximately the actual size to provide some indication as to the extent of the reduction in size achieved by the present invention. Display 150 includes an LED array 155 which includes, in this specific embodiment, 144 light emitting diodes by 240 light emitting diodes. Each light emitting diode is fabricated approximately 20 microns on a side with a center-to-center spacing between adjacent diodes of no more than 20 microns. Each light emitting diode is turned ON with approximately 1.8 volts and utilizes approximately 50 $\mu$A of current when it is turned ON. LED array 155 produces a luminance less than approximately 15 fL. LED array 155 is mounted on the under-surface of a glass substrate 158 and a driver board 160 is bump-bonded to substrate 158. An optical system 165 is also mounted on substrate 158 and magnifies the image approximately 20× to produce a virtual image approximately the size of an 8.5"× 11" sheet of paper.

Here it should be noted that because of the very small LED array 155 and the fact that a virtual image is utilized, rather than a direct view display, the overall physical dimensions of miniature virtual image display 150 are approximately 1.5 inches (3.8 cm) wide by 0.75 inches (1.8 cm) high by 1.75 inches (4.6 cm) deep, or a total volume of approximately 2 cubic inches (32 cm$^3$).

Figure 12:
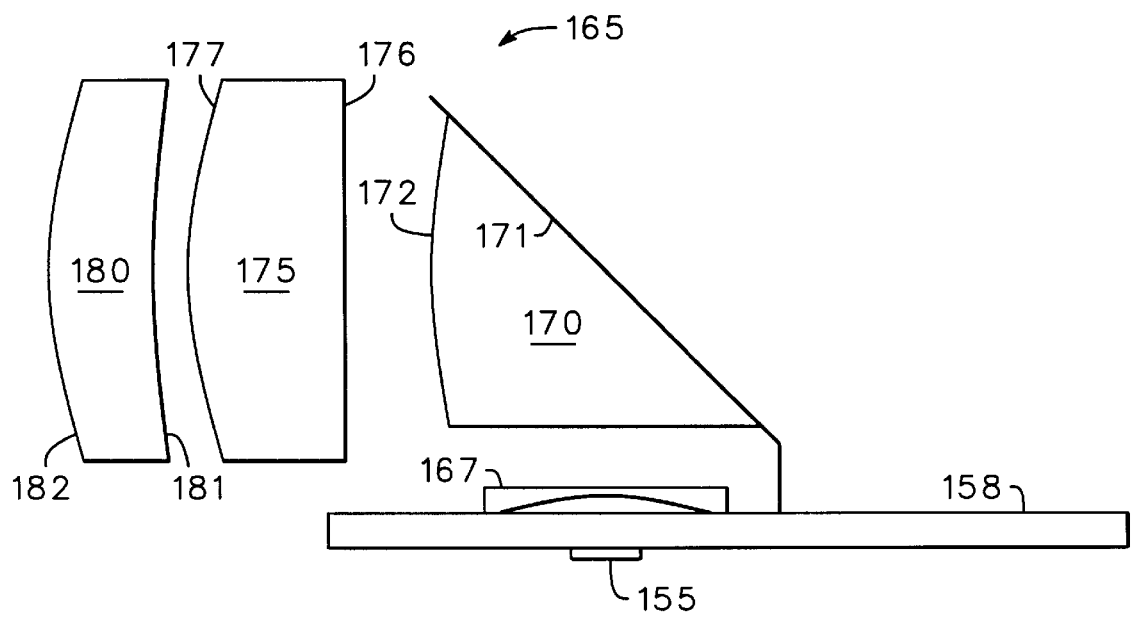
FIG. 12 is a 4× magnified view in side elevation of the structure of FIG. 11.

Referring specifically to FIG. 12, a 4× magnified view in side elevation of miniature virtual image display 150 of FIG. 11 is illustrated for clarity. From this view it can be seen that a first optical lens 167 is affixed directly to the upper surface of substrate 158. An optical prism 170 is mounted to reflect the image from a surface 171 and from there through a refractive surface 172. The image is then directed to an optical lens 175 having a refractive inlet surface 176 and a refractive outlet surface 177. From lens 175 the image is directed to an optical lens 180 having an inlet refractive surface 181 and an outlet refractive surface 182. Also, in this embodiment at least one diffractive optical element is provided on one of the surfaces, e.g. surface 171 and/or surface 176, to correct for aberration and the like. The operator looks into surface 182 of lens 180 and sees a large, easily discernible virtual image which appears to be behind display 150 (as previously described).

It should be noted that in the prior art, pagers and other small receivers in which visual displays are desired are especially handicapped by the size of the displays. Generally such displays are limited to a single short line of text, and the size of the display still dictates the size of the receiver. Utilizing an embodiment of the present invention, a display with several lines of text can be incorporated and the size of the receiver or other portable electronic equipment can be substantially reduced. Further, the display is clearer and easier to read and, because it utilizes a virtual display, requires very little power for the operation thereof. In fact, the present display uses much less power than any of the direct view displays normally utilized in electronic equipment and, as a result, can be fabricated in much smaller sizes.

Thus a greatly improved portable electronic device with miniature virtual image display is disclosed, which incorporates an extremely small LED array or semiconductor chip device. Because a virtual image display is utilized, the display is constructed very small and requires very little power. Further, because of the extremely small size and power consumption of the virtual image display, it is incorporated into portable electronic equipment without substantially effecting the size or power requirements. The miniature virtual display provides a predetermined amount of magnification along with sufficient eye relief and lens working distance to create a comfortable and viewable virtual image. Also, a complete virtual image is produced with no moving parts or power consuming motors and the like. Further, the electronics provided as a portion of the miniature virtual image display allows a variety of very small real images to be generated. The very small real image is magnified into a large virtual image that is easily perceived by the operator.

While we have shown and described specific embodiments of the present invention, further modifications and improvements will occur to those skilled in the art. We desire it to be understood, therefore, that this invention is not limited to the particular forms shown and we intend in the append claims to cover all modifications that do not depart from the spirit and scope of this invention.

What is claimed is:

1. A portable electronic device with virtual display comprising a portable data source and a miniature virtual image display having a viewing aperture, the display being operably attached to the portable data source for receiving data therefrom and having image generation apparatus including a two-dimensional array of LEDs for providing a real image including one of a plurality of lines of alpha-numerics and graphics from the received data, the real image having a luminance of less than approximately 15 fL, and a fixed optical system for producing, from the real image, a virtual image with a dark background and shielded from ambient light reflection perceivable through the viewing aperture in indoor and outdoor environments.

2. A portable electronic device with virtual display as claimed in claim 1 wherein the image generation apparatus includes a light emitting device array defining a plurality of pixels with at least one light emitting device in each pixel and image forming electronics connected to the pixels and to the portable data source.

3. A portable electronic device with virtual display as claimed in claim 1 wherein the light emitting device array includes semiconductor light emitting diodes.

4. A portable electronic device with virtual display as claimed in claim 1 wherein the optical system is further constructed to provide eye relief sufficient to allow an operator to use personal eye glasses when viewing the virtual image in the viewing aperture.

5. A portable electronic device with virtual display as claimed in claim 1 wherein the portable data source includes a two-way radio with a hand held microphone and the virtual image display is mounted in the hand held microphone.

6. A portable electronic device with virtual display as claimed in claim 1 wherein the miniature virtual image display has a physical size less than approximately 2 cubic inches.

7. A portable electronic device with virtual display as claimed in claim 1 wherein the optical system is constructed to magnify the image by a power of at least ten.

8. A portable electronic device with virtual display as claimed in claim 1 wherein the two-dimensional array of LEDs is further defined by each LED of the array of LEDs having an area in the range of 5 to 50 microns on a side.

9. A portable communication receiver with virtual display as claimed in claim 1 wherein the two-dimensional array of LEDs is formed on a single semiconductor chip so as to define a plurality of rows and columns of pixels and is further defined by at least one semiconductor device in each pixel and the two-dimensional array of LEDs is further formed so that each pixel of the plurality of pixels utilizes less than approximately 50 μA of current in an ON condition.

10. A portable electronic device with virtual display comprising:
   a portable data source; and
   a miniature virtual image display electrically connected to the portable data source and having a viewing aperture, the display including,
      image generation apparatus including a two dimensional array of light emitting devices for producing a real image including one of graphics and a plurality of lines of alpha-numerics with a luminance of less than approximately 15 fL, and a fixed optical system mounted adjacent the image generation apparatus to receive the real image therefrom, magnify the image and produce a virtual image with a dark background and shielded from ambient light reflection at the viewing aperture, the optical system producing a magnification more than approximately 10× and sufficient to perceive the virtual image through the viewing aperture in indoor and outdoor environments.

11. A portable electronic device with virtual display as claimed in claim 10 wherein the image generation apparatus providing the real image includes a semiconductor light emitting diode array.

12. A portable electronic device with virtual display as claimed in claim 11 including in addition image forming electronics connected to the image generation apparatus providing the real image and to the portable data source, the image generation apparatus producing the real image in accordance with data received from the portable data source.

13. A portable electronic device with virtual display as claimed in claim 10 wherein the portable data source is a pager.

14. A portable electronic device with virtual display as claimed in claim 10 wherein the miniature virtual image display has a physical size less than approximately 2 cubic inches.

15. A portable electronic device with a miniature virtual display comprising a portable data source and a miniature virtual image display having a viewing aperture, the display being operably attached to the data source and including image generation apparatus including an LED array formed on a single substrate and defining a plurality of rows and columns of pixels in sufficient number to generate one of a complete picture and several lines of text for providing a real image having a luminance of less than approximately 15 fL, the real image being small enough to require magnification to be perceivable with the human eye, and a fixed optical system for producing, from the real image, a magnified virtual image with a dark background and shielded from ambient light reflection viewable through the viewing aperture in indoor and outdoor environments, the LED array and the optical system of the miniature virtual image display providing a magnified virtual image perceivable by an operator without substantially effecting the size and power requirements of the portable electronic device.

16. A portable electronic device with virtual display as claimed in claim 15 wherein the image generation apparatus including an LED array and defining a plurality of rows and columns of pixels further includes at least one semiconductor device in each pixel and image forming electronics connected to the pixels and to the portable data source, the LED array producing the real image in accordance with signals received from the portable data source.

17. A portable electronic device with virtual display as claimed in claim 15 wherein the LED array includes semiconductor light emitting diodes.

18. A portable electronic device with virtual display as claimed in claim 15 wherein the optical system is further constructed to provide eye relief sufficient to allow an operator to use personal eye glasses when viewing the virtual image in the viewing aperture.

19. A portable electronic device with virtual display as claimed in claim 15 wherein the portable data source includes a two-way radio with hand held microphone and the virtual image display is mounted in the hand held microphone.

20. A portable communication receiver with virtual display comprising:

a portable communications receiver; and
a miniature virtual image display electrically connected to the portable communications receiver and having a viewing aperture, the display including,
  image generation apparatus including a semiconductor device array formed on a semiconductor chip and defining a plurality of rows and columns of pixels in sufficient number to generate one of a complete picture and several lines of text for providing a real image having a luminance less than approximately 15 fL, and
  an optical system mounted adjacent the image generation apparatus to receive the real image therefrom, magnify the image and produce a virtual image with a dark background and shielded from ambient light reflections at the viewing aperture,
  the optical system producing a magnification sufficient to perceive the virtual image through the viewing aperture, the semiconductor device array and the optical system of the miniature visual display providing a virtual image perceivable by an operator in indoor and outdoor environments without substantially effecting the size and power requirements of the portable communications receiver.

21. A portable communication receiver with virtual display as claimed in claim 20 wherein the optical system is constructed to magnify the image by a power of at least ten.

22. A portable communication receiver with virtual display as claimed in claim 20 wherein the semiconductor device array formed on a single semiconductor chip and defining a plurality of rows and columns of pixels is further defined by each pixel of the plurality of pixels having an area in the range of 5 to 50 microns on a side.

23. A portable communication receiver with virtual display as claimed in claim 22 wherein the semiconductor device array formed on a semiconductor chip and defining a plurality of rows and columns of pixels is further defined by at least one semiconductor device in each pixel and the semiconductor device array is formed on a single semiconductor chip with each pixel of the plurality of pixels utilizing less than approximately 50 $\mu$A of current in an ON condition.

24. A portable electronic device with a miniature virtual display comprising:

a portable data source; and
a miniature virtual image display having a viewing aperture, the display being operably attached to the data source for visually displaying data received from the data source and including
  image generation apparatus, the image generation apparatus including an LED array formed on a single substrate and defining a plurality of rows and columns of pixels in sufficient number to generate a real image of one of a complete picture and several lines of text, the real image having a luminance of less than approximately 15 fL and requiring magnification to be perceivable with the human eye,
  a fixed optical system for producing, from the real image, a magnified virtual image with a dark background and shielded from ambient light reflections viewable and perceivable by an operator through the viewing aperture in indoor and outdoor environments; and
  the LED array and the optical system of the miniature visual display providing a virtual image perceivable by an operator without substantially effecting the size and power requirements of the portable electronic device.

25. A portable electronic device with a miniature virtual display as claimed in claim 24 wherein the real image is small enough to require at least a power of ten magnification to be perceivable with the human eye and the fixed optical system is designed to produce a magnified virtual image greater than ten times the visual angle of the real image.

26. A portable electronic device with a miniature virtual display as claimed in claim 24 wherein the real image is small enough to require a power of twenty magnification to be fully perceivable with the human eye and the fixed optical system is designed to produce a magnified virtual image twenty times the real image.

27. A portable electronic device with virtual display as claimed in claim 24 wherein the LED array formed on a single substrate and defining a plurality of rows and columns of pixels is further defined by at least one LED in each pixel and the LED array is formed on a single substrate with each pixel of the plurality of pixels utilizing less than approximately 50 $\mu A$ of current in an ON condition.

28. A portable electronic device with virtual display as claimed in claim 24 wherein the miniature virtual image display has a total physical volume of less than approximately 2 cubic inches.

* * * * *